UNITED STATES PATENT OFFICE.

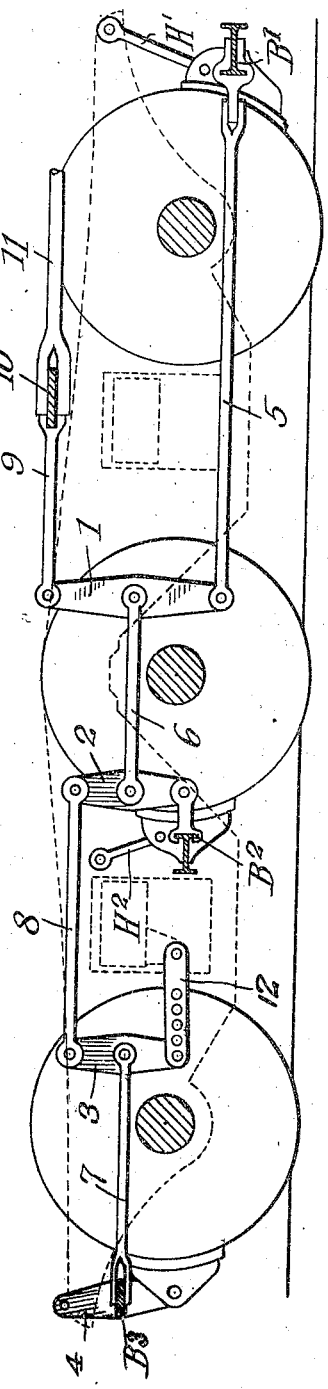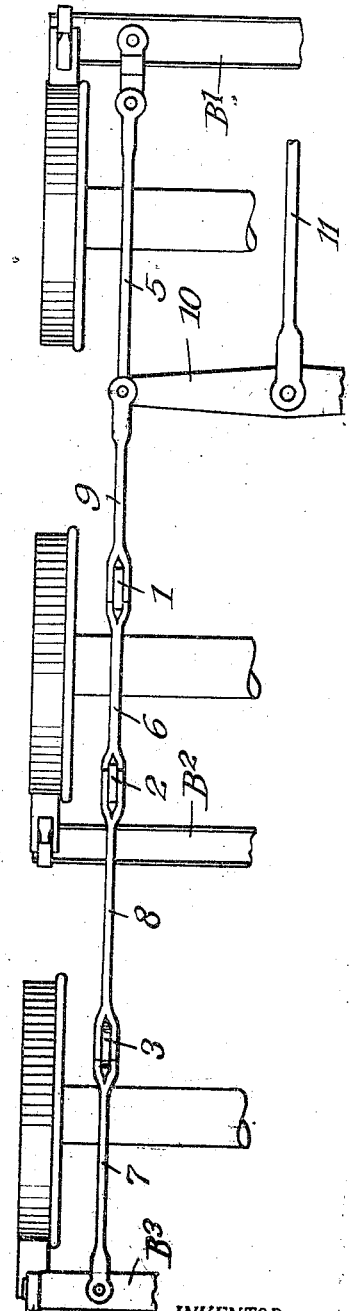

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING FOR SIX-WHEELED TRUCKS.

1,274,677.　　　　Specification of Letters Patent.　　Patented Aug. 6, 1918.

Application filed September 14, 1916. Serial No. 120,056.

*To all whom it may concern:*

Be it known that I, THOMAS L. BURTON, a citizen of the United States, residing at St. Louis, in the State of Missouri, have invented a certain new and useful Improvement in Brake-Rigging for Six-Wheeled Trucks, of which improvement the following is a specification.

This invention relates to brake rigging for railway trucks, and more particularly to six wheeled trucks wherein a single brake beam is applied to each pair of wheels, the object being to provide an improved rigging of this type having a double set of truck levers and rods, one at each side of the truck. The improvement comprises an intermediate live lever connected at its lower end by a rod with the brake beam at one end of the truck, and at an intermediate point to a rod extending in the opposite direction and attached to another live truck lever which is connected at its lower end to the brake beam for the middle pair of wheels, and at its upper end to a rod leading to a dead truck lever pivotally attached to the truck frame, and having a rod connection to the brake beam at the other end of the truck.

In the accompanying drawing: Figure 1 is a longitudinal section of a six-wheeled railway truck, showing, in side elevation, a brake rigging embodying my improvement; and Fig. 2, a half plan view of the same.

According to the construction shown, the brake beams, $B^1$, and $B^3$, are applied to the outer sides of the end pairs of wheels, while the brake beam, $B^2$, is applied to one side of the middle pair of wheels. The main intermediate truck lever, 1, is located between brake beams, $B^1$ and $B^2$, and has the rod, 5, pivotally connected at its lower end and attached to brake beam, $B^1$. From an intermediate point of lever, 1, the rod, 6, extends in the opposite direction from rod, 5, and is pivotally connected to the middle point of the live lever, 2, which is attached at its lower end to brake beam, $B^2$, and at its upper end to rod, 8, leading to the upper end of a dead lever, 3, pivotally attached at its lower end by the link, 12, to the truck frame, and connected at its middle point to the rod, 7, which is attached to the brake beam, $B^3$, at the opposite end of the truck. The beam, $B^3$, is preferably supported on the hanger levers, 4, carrying, at their lower ends, the brake shoes for the end pair of wheels.

This set of rods and levers is duplicated at the opposite sides of the truck, and the pull rods, 9, connected to the upper ends of the live levers, 1, are connected together by the cross equalizer, 10, to which is attached the pull rod, 11, actuated from the brake cylinder. The link, 12, may be provided with a series of holes for adjusting the position of the fulcrum of the dead lever, 3, for taking up the slack, if desired.

When the power is applied through rod, 11, and cross equalizer, 10, to the rods, 9, the levers, 1, are actuated to transmit the stress by the rod, 5, to the brake beam, $B^1$, and through rod, 6, and lever, 2, to the brake beam, $B^2$, and through rod, 8, dead lever, 3, and rod, 7, to the beam, $B^3$, thereby applying the three sets of brake beams and shoes to the wheels with the equalized pressure.

By means of this arrangement of live and dead truck levers, the construction is specially adapted for use in connection with certain types of railway trucks.

Having now described my invention, what I claim as new and desire to secure by Letters Patent is:

1. In a brake rigging for six wheeled trucks having a single brake beam for each pair of wheels, the combination of an intermediate live truck lever having a rod connection to one end brake beam, another live truck lever pivotally connected to the middle brake beam, a dead truck lever having a rod connection to the other end brake beam, and rods connecting said levers.

2. In a brake rigging for six wheeled trucks having a single brake beam for each pair of wheels, the combination of an intermediate live truck lever having a rod connection to one end brake beam, another live truck lever pivotally connected to the middle brake beam, a dead truck lever having a rod connection to the other end brake beam, and a fulcrum at its lower end attached to the truck frame, a rod connecting the live truck levers at intermediate points, and another rod connecting the upper end of the second live lever with the upper end of the dead lever.

3. In a brake rigging for six wheeled trucks having a single brake beam for each pair of wheels, the combination of a double set of truck levers and rods, one set at each side of the truck, comprising an intermediate live truck lever having a rod connection at its lower end to one of the end brake beams, another truck lever pivotally connected at its lower end to the middle brake beam, a dead truck lever having an intermediate rod connection to the other end brake beam, and a fulcrum at its lower end attached to the truck, a rod connecting the live levers, and another rod connecting the upper ends of the second live lever and the dead lever.

4. In a brake rigging for six wheeled trucks, the combination of a brake beam for each pair of wheels, hanger levers connected at an intermediate point to the opposite ends of one of the end brake beams and carrying brake shoes at their lower ends, an intermediate live truck lever having a rod connection to the other end brake beam, another live truck lever pivotally connected to the middle brake beam, a dead lever having a rod connection to the end brake beam, and a fulcrum attached to the truck, a rod connecting the live levers and another rod connecting the upper ends of the second live lever and the dead lever.

5. In a brake rigging for six wheeled trucks, the combination of a brake beam for each pair of wheels, hanger levers connected at an intermediate point to the opposite ends of one of the end brake beams and carrying brake shoes at their lower ends, a double set of truck levers, one at each side of the truck and comprising intermediate live truck levers having rod connections at their lower ends to one of the end brake beams, another pair of live truck levers pivotally connected at their lower ends to the middle brake beam, dead truck levers having intermediate rod connections to the other end brake beam, and a fulcrum at the lower end attached to the truck, a rod connecting the live levers, and another rod connecting the upper ends of the second live lever and the dead lever.

In testimony whereof I have hereunto set my hand.

THOMAS L. BURTON.